July 1, 1941.  W. A. THUM  2,247,672

ARTICLE HANDLING MACHINERY

Filed Jan. 5, 1939

INVENTOR
Walter A. Thum.
By [signature]
ATTORNEY

Patented July 1, 1941

2,247,672

UNITED STATES PATENT OFFICE 2,247,672

ARTICLE HANDLING MACHINERY

Walter A. Thum, St. Louis, Mo., assignor to Papendick, Inc., St. Louis, Mo., a corporation of Missouri Application January 5, 1939, Serial No. 249,373

4 Claims. (Cl. 198—31)

This invention relates generally to article handling machinery and, more particularly, to a certain new and useful improvement in machinery particularly, though not exclusively, adapted to handle and transport rectilinear food articles, packages, and the like, such, for instance, as baked bread loaves or fractions thereof.

Reference is made to certain co-pending applications of Gustav C. Papendick, of St. Louis, Missouri, for methods and means for fractionating and packaging baked bread loaves, Ser. Nos. 242,430, 242,431, 242,432, and 242,433, to which this present application is related. It appears therefrom that it has become very desirable in the bread industry to sub-divide sliced bread loaves into a plurality of fractions and separately wrap such fractions. It has since been found that, under certain circumstances, it may also be desirable to reassemble wrapped fractions and wrap them together in the formation of a larger package or unit. As a matter of fact, this is particularly true in the formation of composite bread loaves, wherein it is desirable to wrap several different fractions of bread, such as whole wheat, rye, and white, for instance, separately and then combine them in an outer wrapper as a composite loaf unit.

My invention hence has for its primary objects the provision of mechanism adapted especially for handling wrapped bread loaf sections or other similarly shaped rectilinear packages for re-alignment from consecutive series into axially aligned sets, and which will decelerate the forward motion of the bread loaf fractions after axial re-alignment for delivery at proper timed intervals to further wrapping equipment in a pre-determined speed relationship to the initial wrapping equipment.

My invention has for a further object the provision of mechanism of the type and for the purpose stated which is simple and sturdy in structure, economical in upkeep and maintenance, automatic in operation, and efficient in the performance of its intended functions.

And with the above and other objects in view, my invention resides in the novel features of form, construction, arrangement, and combination of parts presently described and pointed out in the claims.

Figure 1:
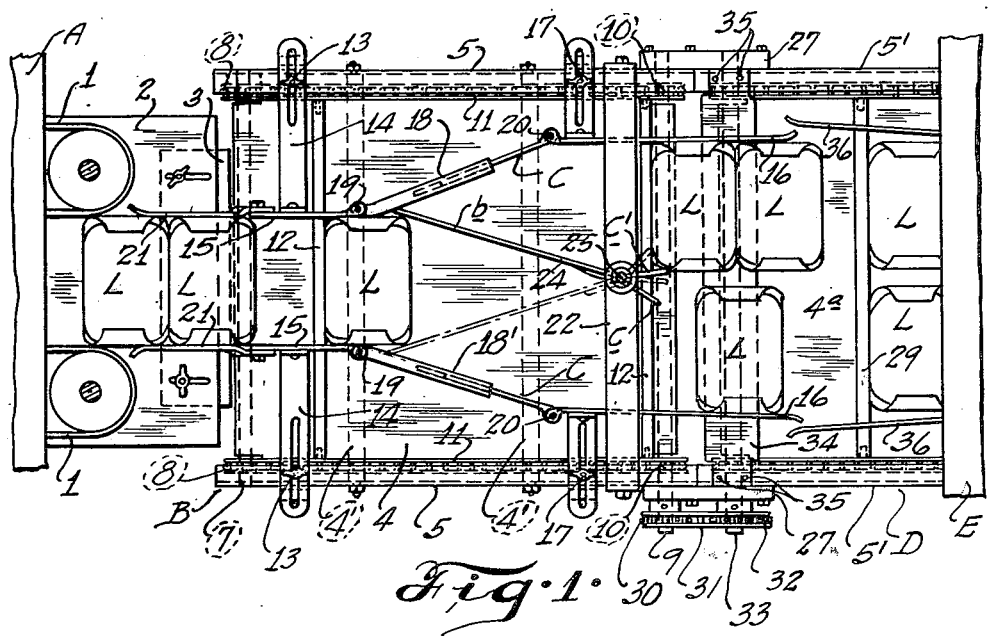
Figure 2:
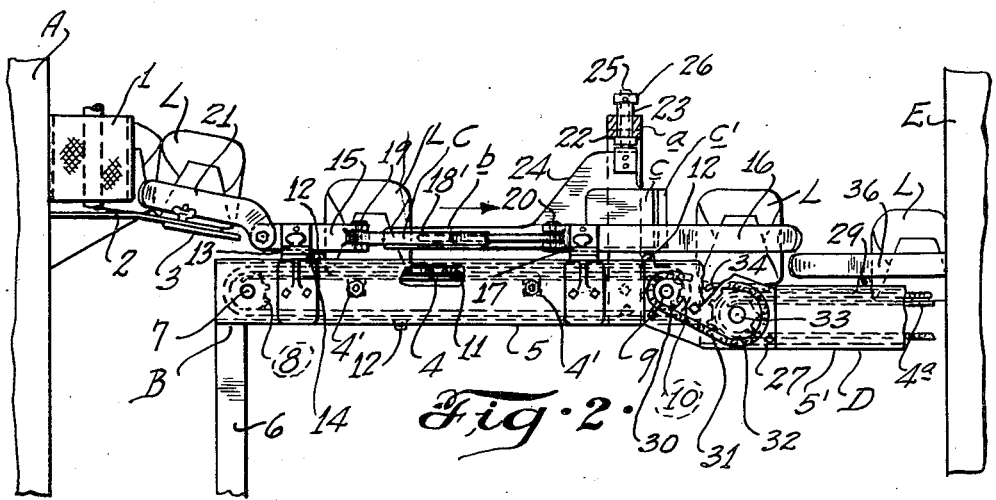

In the accompanying drawing,

Figure 1 is a top plan view of an article handling mechanism constructed in accordance with and embodying my present invention; and Figure 2 is a side elevational view of the mechanism.

Referring now more in detail and by reference characters to the drawing, which illustrates a preferred embodiment of my invention, A designates a primary wrapping machine, which includes a pair of spaced belts 1, 1, and a receiving plate 2 having an adjustable extension 3 for depositing articles, such as wrapped loaf-sections L successively upon a flat plate, table, or the like 4 supported by spaced rods 4' extending transversely between opposed parallel channels 5, in turn, supported by upstanding legs or the like 6.

Co-operable with the table 4, is a first conveying or transferring mechanism B, which includes a shaft 7 journaled at its opposite ends in, and extending horizontally between, the channels 5, and equipped with spaced idler sprockets 8. Similarly journaled in, and extending horizontally between, the channels 5 in spaced relation to the shaft 7, is a drive shaft 9, fixed on which in peripheral alignment with the sprockets 8, is a pair of sprockets 10. Trained over the aligned sets of sprockets 8, 10, is a pair of parallel endless chains 11 crosswise connected by pusher bars 12, the latter moving over the table 4 and being spaced at even distance along the chains 11, all as best seen in Figure 1 and for purposes presently more fully appearing.

Having slot-and-pin adjustable connection, as at 13, with the channels 5, are opposed rigid angle-brackets 14 supporting at their respective inner ends loaf-guides or track-way defining members C, which are constructed preferably of flat bar stock, and which comprise first or rear end-portions 15 extending in parallel relation lengthwise of the table plate 4, second straight or parallel forward end-portions 16 having slot-and-pin adjustable bracket connection, as at 17, with the channels 5, and intermediate telescopically adjustable or extensible portions 18, 18', which oppositely diverge from the first end-portions 15 and are pivotally connected, as at 19, 20, with the respectively end-portions 15, 16, all also as best seen in Figure 1. As shown, the rear track end-portions 15 are preferably suitably provided with like parallel and spaced track-defining extensions 21 presented rearwardly over the plate 2.

Fixed to and upon the channels 5 at or adjacent the forward end thereof and presented upwardly over the table 4, is a U-shaped bridge 22 centrally provided with a downwardly extending long bearing 23 for swingably supporting an article or loaf guide plate or switch-member 24 adapted for swingable movement over and clear of the pusher bars 12 of the mechanism B, the member 24 including a hub $a$, a relatively long tongue b projecting radially from the hub a for successive or alternate engagement with the intermediate track-members 18, and divergent tails c, c', projecting radially from the hub a in opposed relation to the tongue b for successive or alternate tongue-swinging engagement by respective loaf-members or articles L. As shown, the mounting of member 24 preferably comprises a stud 25 loosely mounted, and by a set-collar or the like 26 suspendingly retained, in the bearing 23.

At its forward end, the table 4 is connected by side plates 27 to the rear end of a table extension 4ª, co-operable with which is a second conveying or transferring mechanism D of a secondary wrapping machine E. The second conveying mechanism D is also preferably of conventional flight-bar type having flight-bars 29 spaced at the same distance apart as the bars 12 of the first conveying mechanism B, the mechanism D, however, moving at one-half the speed of the mechanism B. To such end, fixed on an extended end of the drive shaft 9, is a small sprocket 30 drivingly connected by a chain 31 to a large sprocket 32 fixed on a drive shaft 33 of the mechanism D.

A dead-plate 34, secured by suitable fastening members 35 to channel-extensions 5', bridges the space between the table 4 and its extension 4ª, and suitably adjustably mounted on the channels 5' for co-operation with the track-portions 16, is a pair of supplemental relatively conveying guide-rail or track-members 36 spaced at their rear end a distance somewhat greater than the distance between the track-members 16, all as best seen in Figure 1 and for purposes presently more fully appearing.

In use and operation, a wrapped loaf-section or other article is fed by the belts 1 of the wrapper A to and upon the receiving plate 2 and remains in such position until the next oncoming loaf-section L pushes the first section or article L through the track-extensions 21 and onto the table 4 between the track-members 15. So disposed, the first section L is in front of an oncoming pusher bar 12, which, in turn, progresses such loaf-section L over the table plate 3 between the track-members 15. Thus the several fed and moved articles or wrapped loaf-sections L are confined by the track-members 15 for movement successively in a single row.

Now, initially, as it may be said, the tongue b of the guide or switch-member 24 is in a position as shown in dot-and-dash lines in Figure 1. Hence, the first loaf-section L, in the course of its forward movement, is deflected to move under propulsion by its engaging flight-bar 12 in a divergent path or track defined by the tongue b and the oblique track-portion 18, until such loaf-section L collides with the wing or tail c' disposed in its path, as shown. The moving section or article L is restrained from outward movement by a straight track-portion 16, which also projects over the dead-plate 34, and hence the member 24 is by the moving section L swung to its opposite position or into the position thereof shown in full lines in Figure 1.

The next succeeding loaf-section L is moved similarly in the single row path defined by the track-portions 15, the first loaf-section L having by this time progressed to a point as shown in Figure 1 to a momentarily stationary position on one side of the dead-plate 34. The succeeding loaf-section L is then progressed forwardly by a succeeding pusher bar 12 through another divergent path defined by the tongue b and the intermediate track-portion 18' until such second loaf-section L engages the wing or tongue c, the member 24 being thereby swung to its said initial position. Thus the second succeeding loaf-section L will come to rest momentarily on the dead-plate 34 in axially spaced approximate alignment with the first loaf-section L. The so aligned and spaced loaf-sections L on the dead-plate 34 are pushed one at a time onto the table-extension 4ª by the succeeding loaf-sections and simultaneously in axial or transverse alignment progressed by a pusher bar 29 of the mechanism D between the supplemental track-members 36, which taper inwardly for moving the aligned loaf-sections L into substantially endwise abutting relation before being fed into the wrapper E for final wrapping of the two loaf-sections L into one package unit.

Thus automatically and progressively the several wrapped loaf-sections or other articles L are first confined and moved in a single row, are then divided and moved in diverging paths, then successively moved forwardly in two spaced parallel paths or rows, and are finally, while being so moved forwardly, shifted into endwise abutting relation as they are being fed into, and for wrapping in pair relation in a single package or unit by, the second wrapping machine E.

Should it become necessary to adjust the track-defining members C for the accommodation of either longer or shorter loaf-sections or other articles L, the connections 13, 17, may be loosened and the brackets 14, 14', shifted either toward or away from the center line of the table 4, as the case may require. Since the space between the straight forward track-members 16 should be substantially twice the distance between the rear track-members 15, the angular inclination and length of the intermediate sections 18, 18', must necessarily change. Hence such sections 18, 18', are pivotally connected at their ends to the end track-sections 15, 16, and are also shiftably or telescopically extensible, such adjustment in angular inclination and length being automatically made as the shifting adjustment of the straight sections is effected.

The mechanism fulfills in every respect the objects stated, and it should be understood that changes and modifications in the form, construction, arrangement, and combination of the several parts of the mechanism may be made and substituted for those herein shown and described without departing from the nature and principle of my invention.

Having thus described my invention, what I claim and desire to secure by Letters Patent is,

1. Article handling mechanism including a pair of trackway defining members, said members including first parallel portions adjustably spaced for accommodating therebetween merely a single row of the articles being handled, second parallel portions adjustably spaced for accommodating therebetween a plurality of rows of said articles, and oppositely oblique lengthwise extensible intermediate portions connecting the first and second portions.

2. Article handling mechanism including a pair of trackway defining members, said members including first parallel portions adjustably spaced for accommodating therebetween merely a single row of the articles being handled, second parallel portions adjustably spaced for accommodating therebetween a plurality of rows of said articles, and oppositely oblique lengthwise extensible intermediate portions having pivoted connection with the first and second portions connecting the first and second portions.

3. In conveying mechanism, a pair of co-operable track-defining members having spaced front-end portions, rear-end portions spaced from each other by a distance substantially greater than the distance between the front-end portions, and intermediate diverging portions, in combination with a switch-member pivoted intermediate said rear-end portions for swingable movement for engaging one of said intermediate portions for extending in approximate parallelism with the other intermediate portion.

4. Article handling mechanism including a conveyor table having an intake end and a discharge end, a pair of trackway-defining members including first opposed parallel sections shiftably mounted adjacent the intake end, second opposed parallel sections shiftably mounted adjacent the discharge end, said first and second sections being each respectively connected by longitudinally extensible intermediate sections, a bridging member mounted above the table, and switching means removably suspended from the bridging member and co-operable with said trackway-defining members for causing the articles to move in the pair of rows.

WALTER A. THUM.